May 9, 1967 W. B. CRUMPLER 3,318,622

ALL-DIRECTIONAL FASTENER

Filed March 24, 1965

INVENTOR
WEYMOUTH B. CRUMPLER

BY

ATTORNEYS

3,318,622
ALL-DIRECTIONAL FASTENER
Weymouth B. Crumpler, Newport News, Va., assignor to the United States of America as represented by the Secretary of the Administrator of the National Aeronautics and Space Administration
Filed Mar. 24, 1965, Ser. No. 442,558
10 Claims. (Cl. 287—189.36)

The invention described herein may be manufactured and used by or for the Government of the United States of America for governmental purposes without the payment of any royalties thereon or therefor.

This invention relates generally to a fastener and more particularly to a fastener for permitting all-directional movement of a skin section or panel with respect to its supporting structure.

Thermal expansion of skin sections or panels which are rigidly secured to a support structure produces stress concentrations which frequently cause the skin to rupture or buckle. If the skin section subjected to thermal expansion is on an aircraft or test model that is being investigated for stresses associated with operation, these thermal expansion stresses caused by the model support may be sufficient to cause acquisition of incorrect data. Many storage tanks and enclosures are subjected to extreme variations of temperature which also cause either thermal expansion or contraction of the panel structure that enclose the volume being used. In these situations, the buckling of the panels naturally weakens the panel or skin and may eventually result in fatigue of the material and thereby shorten the life span of that individual panel. Obviously, a rupture due to thermal expansion for fluids is highly undesirable. Many fastener devices have been developed for securing a relatively movable panel to its rigid support. However, these previously known devices do not permit all-directional movement of the panel. They relate to connections wherein the panel or skin section is permitted movement only in the plane thereof. These devices generally incorporate a fastener element extending through the panel and a mount on the rigid support wherein the fastener element or bolt is secured to a nut or other elongated member of substantial area which is permitted to slide upon the mount with the bolt member fitting through elongated slots or large open areas. Such a construction necessarily has the inherent disadvantage of considerable friction forces being established between the contacting surfaces as well as being incapable of permitting all-directional movement.

The present invention overcomes the difficulties of the prior art by connecting the panel to a mount on the rigid support by a bolt and nut which are permitted freedom of movement in all directions with a minimal amount of surface contact between the elements to thereby minimize frictional forces and permit the panel to move without establishing stress concentrations.

It is an object of this invention to provide a fastener for securing a panel or skin section to a rigid support so as to alleviate stress concentrations in the panel.

Another object of this invention is to provide a fastener permitting all-directional movement of a panel with respect to the rigid support to which it is secured.

A further object of this invention is to provide a wall construction that may be subjected to extreme thermal variations without being subjected to the extreme stress concentrations and damage attendant therewith.

Still another object of the instant invention is to provide a fastener which matingly engages a surface of a panel and extends therethrough to a flexible connection mounted on a rigid support.

A still further object of this invention is to provide a fastener which has a minimal amount of surface contact with the panel, or the rigid support to which it is secured, in order to reduce frictional forces between the fastener element and the members being connected.

Another object of the instant invention is to provide a fastener having a bolt threaded at one end for connection to a nut member held by a spring within a casing and a head having an arcuate surface adjacent the shank which mates with a similarly arcuate surface on the panel.

Still another object of the instant invention is to provide a novel insert for a panel which includes a hemispherical indent surface on one face and a frustum-shaped opening from the other face which meets with the indent to form an opening through the insert.

Generally, the foregoing and other objects are accomplished by the instant inventive fastener wherein a panel having a hemispherical indentation in the exterior face that communicates with a frustum-shaped opening extending from the rear of the panel is secured to a rigid support by a bolt having a hemispherical surface on the head adjacent the shank thereof which matingly engages the hemispherical indentation in the panel surface. The bolt is threaded on the other end of the shank and engages a nut member having arcuate edges and a protrusion from the bottom thereof. The nut member is located within an inverted cup-shaped casing having a central aperture in the bottom and an outwardly extending flange at the mouth that permits bolts or screws to mount the casing and a plate having an elongated slot, for reception of the elongated protrusion of the nut member, to the rigid support. A helical spring is disposed in the cup portion of the casing between the nut member and the bottom thereof to provide flexibility in a direction perpendicular to the plane of the panel.

A more complete appreciation of the invention and many of the attendant advantages thereof will be readily apparent as the same becomes better understood by reference to the following detailed description when considered in connection with the accompanying drawings wherein.

Figure 2:
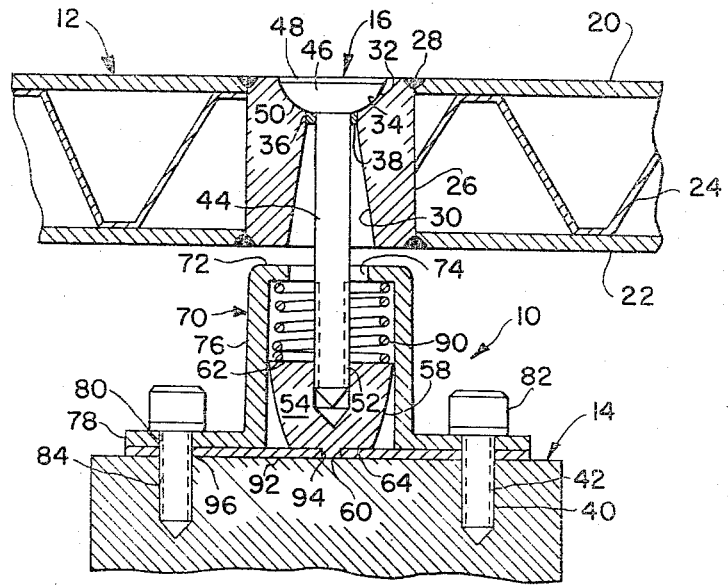
FIG. 2 is a cross section of the fastener of the instant invention prior to complete mounting thereof.
Figure 1:
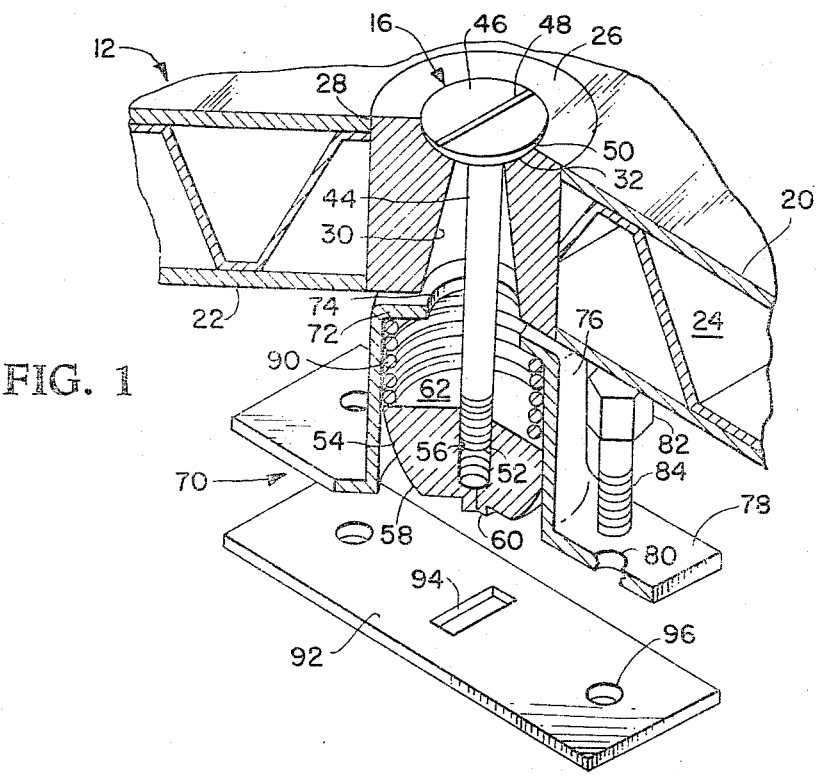
FIG. 1 is an isometric partially exploded view of the invention.

Referring now to the drawing, wherein like reference numerals designate identical or corresponding parts throughout the several views wherein novel fastener 10 is shown as securing panel 12 to rigid support member 14. Panel 12 is of conventional construction and is shown in FIG. 2 as comprising an exterior or outer surface 20 and an interior or rearward face 22 joined by a honeycomb or corrugated core 24. Insert or plug 26 includes frustum-shaped opening 30 extending from the rear face thereof. Indent 32 has hemispherical surface 34 that communicates with frustum opening 30 at joint line 36. Insert 26 is welded or glued or secured in some other manner to panel 12 as desired and as is within the purview of the artisan. Flexible seal 38 fits within the opening in insert 26 at the point where indent 32 and frustum conical opening 30 meet to permit formation of a fluid-tight connection.

Fixed frame or support member 14 is shown as having bores 40 extending thereinto with inserts 42 for receiving threads 84 of bolts 82 as will be described more fully hereinafter.

Bolt 16 has elongated shank 44 and head 46 at one end with threads 52 at the other end thereof. Bolt head 46 is provided with a conventional slot 48 for rotation thereof for engagement with nut 54. Undersurface 50 of bolt head 46 is the portion adjacent shank 44 and is a section of a hemispherical surface that matingly engages concave hemispherical surface 34 of indent 32. Nut member 54 is of substantially right conical configuration in cross section and includes substantially flat upper surface 62 having central threaded bore 56 for engagement with threads 52 on bolt shank 44. Longitudinal peripheral edges 58 are arcuate and extend from upper surface 62 to lower surface 64 from which extends an elongated substantially rectangular protrusion 60. Arcuate edges 58 permit relative angular movement of nut member 54 in casing 70.

Fastener casing 70 is of substantially inverted cup shape having bottom 72 and sidewalls 76 that form the cup portion and an outwardly extending flange 78 extending about the mouth of the casing. Bottom 72 has a substantially circular aperture 74 for permitting shank 44 of bolt 16 to extend therethrough. Flange 78 is provided with spaced peripheral apertures 80 that receive bolts 82 threaded at 84 for threadingly engaging inserts 42 in fixed support 14.

Backer plate 92 is provided with a substantially rectangular central elongated slot 94 for engaging protrusion 60 to prevent relative lateral rotation of nut 54 during assembly. Apertures 96 in backer plate 92 coincide with spaced peripheral apertures 80 to permit bolts 82 to extend therethrough for their mating engagement with fixed support 14.

Helical spring 90 fits about shank 44 of bolt 16 and around aperture 74 to abut bottom 72 of casing 70 at one end and upper surface 62 of nut member 54 at the other end. It is to be understood that although spring 90 is shown as helical, any similar type of properly designed resilient member could be utilized for applying the necessary force against nut member 54 to act against and hold panel 12 a relatively fixed distance from support member 14.

OPERATION

Panel 12 would be secured in place by mounting casing 70 on fixed support 14 with plate 92 in position. It is to be understood that as casing 70 is secured to support 14 nut member 54 would be positioned within casing 70 with helical spring 90 acting to force nut member 54 and protrusion 60 against backer plate 92 and into elongated slot 94, respectively. Panel 12 would already be provided with inserts 26 at a predetermined spacing depending upon stresses and weight to be supported or, in the alternative, panel 12 may be of a construction to permit inclusion of frustum-shaped opening 30 in the interior face and hemispherically concave surface 34 in the outer face thereof.

Bolt 16 is inserted from exterior face 20 of panel 12 to extend through opening 30 into aperture 74 and through spring 90 to threadingly engage nut member 54. If a fluid-tight seal is necessary, bolt 16 would extend through flexible seal 38, made of a material such as silicone rubber, which fits about shank 44 to permit substantially all-directional pivotal movement of bolt 16 and panel 12. By insertion of a proper tool, for example a screwdriver, into slot 48 bolt 16 may be rotated to threadingly engage threads 52 in threaded bore 56. As bolt 16 is rotated and threads 52 engage bore 56 spring 90 assists in maintaining protrusion 60 in slot 94 to prevent relative rotation of nut member 54. Once mating surfaces 34 and 50 have contacted one another and bolt 16 is continued to be rotated the threaded engagement of shank 44 causes panel 12 to be moved inwardly toward fixed support 14 until the force of spring 90 is overcome to draw protrusion 60 from slot 94. When panel 12 is substantially located as desired and protrusion 60 has been released or withdrawn from slot 94 fastener 10 is in operative position.

Exterior panel surface 20 faces into a storage area or is a skin coming in contact with variations of temperature to thereby become subjected to thermal expansion and contraction which would normally create considerable stress concentrations causing buckling or rupture. However, with fastener 10 in operable position it is apparent that should the forces acting on the panel tend to move panel 12 to the left, as seen in FIG. 2, bolt head 46 would tend to move to the left and bolt 16 would rotate counterclockwise in the plane of the paper with surface 34 sliding or moving on surface 50. The counterclockwise rotation of bolt head 46 causes shank 44 to also rotate in a counterclockwise direction which in turn causes nut member 54 to rotate in a counterclockwise direction in the plane of the drawing. It is readily apparent that arcuate surfaces 58 of nut member 54 permit such rotation without nut 54 encountering sidewalls 76 of casing 70.

Fastener 10 as shown herein is capable of being fabricated with extremely small dimensions and therefore requires arcuate surface 58 on nut member 54. However, it is to be understood that if dimensions are not critical and casing 70 could be of any desired size within reason, member 54 could be of substantially conventional configuration so long as protrusion 60 is provided or some other means utilized to prevent lateral rotation of nut member 54 during engagement of bolt 16. Since bolt 16 engages and has a hemispherical surface, it is apparent that panel 12 could move in any direction in the plane of exterior surface or face 20. By proper design and calibration, spring 90 may be provided with a specific force that would substantially neutralize it once nut member 54 has been securely engaged by shank 44 and protrusion 60 removed from slot 94 thereby permitting panel 12 to move either away from or toward fixed support member 14. Accordingly, it is seen that panel 12 is permitted relative movement in all directions with respect to fixed support 14 and there is a minimum amount of surface contact between the moving elements to thereby minimize frictional forces tending to prohibit release of the stress concentrations.

The instant inventive fastener permits all-directional movement with a minimum prohibition thereof and thereby is useful for securing relatively movable panels, that are subjected to extreme thermal variations, to a rigid support member. The instant fastener is readily applied and requires a minimum of tools and skill therefor and is relatively inexpensive to fabricate while providing a positive connection between two elements previously unable to be secured together. Any number of fasteners in accordance with this invention may be utilized to avoid rupture or buckling of the panel skin and to permit a fluid-tight seal between panels as well as at points of connection.

Obviously many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. In an all-directional fastener, the combination comprising: a bolt having a shank threaded at one end and a head at the other end; said bolt head having a hemispherically convex surface on the side thereof adjacent said shank; a casing of inverted cup shape having an outwardly projecting flange at the mouth and a central aperture in the bottom thereof; helical spring means disposed in said casing about said aperture; a nut having a threaded central bore for receiving said one end of said bolt disposed in said casing in juxtaposition to said spring means; arcuate edges on said nut to permit angular movement thereof within said casing and a protrusion on the side opposite that of said central bore for engaging a slot to prevent lateral rotation of said nut when said bolt is threaded thereinto; a plate for mating engagement with said flanges and having a central slot for receiving said protrusion; and means for rigidly attaching said casing to a fixed support member.

2. A fastener element comprising: a cup-shaped casing having a central aperture in the bottom thereof for receiving a bolt for threaded engagement with a nut; an outwardly extending flange at the mouth of said casing for attachment of a plate thereto; helical spring means disposed in said casing; a nut disposed in said casing in juxtaposition to said spring means; said nut having a threaded central bore in one end and an elongated protrusion on the other end; the longitudinal peripheral edges of said nut being arcuate for providing said nut with a cross sectional dimensional at said other end less than at said one end; a plate over the mouth of said casing for retaining said spring means and nut in said casing; and an elongated slot in said plate for mating engagement with said protrusion, whereby said spring assists in forcing said nut against said plate with said protrusion in said slot to prevent lateral rotation of said nut during the threading of an element into said bore.

3. The combination of claim 2 wherein a bolt threadingly engages said nut to extend through said aperture in said casing.

4. The combination of claim 3 wherein said bolt includes a head having an arcuate surface adjacent said shank for mating with a similarly arcuate surface on a relatively movable member.

5. The combination of claim 4 including a relatively movable member comprising: a substantially rigid element having a plurality of faces with a conical opening in one face thereof; an arcuate surfaced indent in an opposite face for mating with said arcuate surface of said bolt head; and said opening and indent being in communication with one another.

6. In a structure subjected to expansion and contraction the combination comprising: a substantially rigid support; a casing of substantially inverted cup-shape having a central aperture in the bottom and a flange at the mouth thereof; said flange extending outwardly substantially perpendicular to the sidewalls of said cup-shaped casing; apertures spaced about the periphery of said flange; securing means extending through said apertures to said support for mounting said casing on said support; a nut member having a threaded central bore on one side and arcuate edges to permit angular movement thereof; a panel having an opening therethrough located adjacent said casing; connector means extending through said opening and secured to said nut member; an elongated projection on said nut member on the side thereof opposite said bore; means cooperating with said projection for preventing rotation of said nut member while said connector means is threadingly engaged therewith; and means for resiliently mounting said nut member in said casing, whereby said panel is permitted relative movement in all directions with respect to said rigid support.

7. The combination of claim 6 wherein said connector means comprises a bolt having a shank threaded at one end for securement to said nut member and a head at the other end; and arcuate surface on said head adjacent said shank for mating engagement with said panel.

8. The combination of claim 7 wherein said panel opening comprises a frustum-shaped opening extending toward the panel face from the rearward face; an arcuate indent in said panel face for mating engagement with said arcuate surface of said bolt head; and said frustum-shaped opening and indent having their deepest portions in communication with one another to form an opening extending completely through said panel to permit said bolt to extend therethrough for securement to said nut member whereby said panel is permitted slight freedom of movement in all directions with respect to said support while being maintained in substantially the position desired.

9. The combination of claim 8 wherein said through opening is formed in a supplemental member thereby providing an insert rigidly mounted between the panel faces.

10. The combination of claim 9 wherein a flexible seal is mounted in said insert at the juncture of said frustum-shaped opening and said indent to surround the shank of said bolt for preventing fluid flow from one side of said panel to the other without inhibiting the freedom of the panel to move with respect to said support because of expansion and contraction forces.

References Cited by the Examiner
UNITED STATES PATENTS

| | | | |
|---|---|---|---|
| 1,663,612 | 3/1928 | Reid | 287—21 |
| 2,140,628 | 12/1938 | Hoff | 287—189.36 |
| 2,239,908 | 4/1941 | Bauer et al. | 85—1.5 |
| 2,571,443 | 10/1951 | Hair | 287—21 X |
| 2,884,098 | 4/1959 | Hutchison | 287—189.36 |
| 2,907,418 | 10/1959 | Hudson et al. | 151—41.76 X |
| 3,093,222 | 6/1963 | Christoffersen et al. | 287—189.36 |

FOREIGN PATENTS

| | | |
|---|---|---|
| 449,473 | 6/1948 | Canada. |
| 1,289,527 | 2/1962 | France. |

References Cited by the Applicant
UNITED STATES PATENTS

| | | |
|---|---|---|
| 932,342 | 8/1909 | Smith. |
| 1,077,048 | 10/1913 | Dodds. |
| 1,100,292 | 6/1914 | Duryea. |
| 1,137,600 | 4/1915 | Gallagher. |
| 1,455,645 | 5/1923 | Mennie. |
| 2,516,671 | 7/1950 | Bowers et al. |
| 2,826,231 | 3/1958 | Alden. |
| 2,948,316 | 8/1960 | Sing et al. |

REINALDO P. MACHADO, *Primary Examiner.*